Patented Nov. 10, 1953

2,658,924

UNITED STATES PATENT OFFICE 2,658,924

CATALYTIC HYDRATION OF OLEFINS

Sigmund J. Lukasiewicz, William I. Denton, and Charles J. Plank, Woodbury, N. J., assignors to Socony-Vacuum Oil Company, Incorporated, a corporation of New York No Drawing. Application July 5, 1950, Serial No. 172,188

1 Claim. (Cl. 260—641)

This invention relates to a process for the catalytic hydration of olefins having three to five carbon atoms to produce alcohols and is specifically concerned with provision of a novel catalyst capable of producing high yields of the desired alcohols.

The novel catalyst with which the invention is concerned is a composite of silica and alumina prepared by precipitating silicon dioxide on porous alumina. Preferably the catalyst contains about 10 to about 25% $SiO_2$. Minor amounts of various activating oxides may also be present, as for example, around one weight per cent or a little more of the oxides of silver, mercury, tin, tungsten and the like. However, the catalyst must be substantially free of alkali metal oxides which have a strong inhibiting effect on the catalyst. The alkali metal content should be less than about 0.5% and is preferably reduced to as low a value as can be achieved economically.

Porous catalysts have been proposed for hydration. Specifically, the use of alumina, which may be activated as by impregnation with acid salts such as aluminum sulfate, has been described. The theory on which these catalysts are proposed appears to be analogous to the older sulfuric acid process since the modified alumina catalysts are characterized for the most part by anions of strong mineral acids incorporated either by treatment with acid or by impregnation with an acid reacting salt.

It has now been discovered that silica-alumina composites as described above are superior catalysts for the catalytic hydration of olefins having three to five carbon atoms. These novel catalysts are characterized by substantial absence of anions of strong acids and cations of strong bases. The present catalysts normally contain such ions during the process of manufacture. However, the manufacture is conducted in such manner that these components are removed from the catalyst before it is finished. Thus, the base alumina may be formed by precipitation from a sol prepared by mixing sodium aluminate and sulfuric acid solutions. During manufacture, sodium is removed by water washing until free of sodium and acid anions.

These catalysts are effective for conversion to alcohols of propylene, butenes and amylenes. No yield of product is obtained when ethylene is treated under conditions similar to those found effective for olefins of three to five carbon atoms. As the number of carbon atoms is increased above three, the yields are reduced to such an extent that the process is not found practicable for olefins of six or more carbon atoms.

In conducting the hydration reaction, olefin vapor is contacted with the catalyst under suitable conditions of temperature and pressure in the presence of a molar excess of water with respect to olefin. At least part of the water is also in vapor phase and this reactant may be wholly vaporous or partly liquid. The concepts of mixed phase operation and of water pretreatment for improving the catalytic reaction are described and claimed in copending application Serial No. 127,168, filed November 14, 1949. Since the novel methods of conducting the reaction described in the said copending application result in increased efficiency, many of the examples set out hereinafter utilize those concepts. The present invention, however, is not restricted to such operation, since the novel catalyst exhibits its advantages in hydration of $C_3$ to $C_5$ olefins generally.

The present catalysts are, in general, active for promoting a large number of hydrocarbon reactions and mention is made of polymerization, cracking and hydrogen transfer as important side reactions in connection with catalytic hydration. These side reactions result in formation of polymers, saturated hydrocarbons and dense solid deposits of high carbon content referred to herein as "coke." The side reactions also result in formation of oxygenated compounds such as ketones and, in some instances, esters and other by-products.

The commercial desirability of catalytic hydration of olefins to produce alcohols is related to ability to obtain conversions of olefins to reasonable amounts of alcohols without degradation of the olefin not consumed in the production of alcohols to by-products of little or no value compared to the charge stock and desired product.

The method for conducting the catalytic hydration described in said copending application greatly increases the selectivity of the reaction; that is, increases the percentage yield of alcohol based on olefin consumed. It has been found possible to conduct the operation in such manner that the selectivity approaches 100% in the case of propylene. A selectivity of 99% is readily obtained with high single-pass yields of alcohol based on total olefin charge to the reaction.

The conditioning of the catalyst by preliminary water treatment results in a drastic reduction of surface area of the porous solid, a result which is generally regarded as undesirable in connection with porous catalysts. In typical instances the fresh catalyst is reduced to about one tenth its original surface area on the initial conditioning treatment before beginning the first run.

This conditioning treatment results in a catalyst which gives increased yields of alcohols and very low yields of saturated hydrocarbons, coke, ketones, and the like. Not only does this indicate a greater efficiency in that the olefin consumed is more largely converted to the desired product, but it further gives an important commercial advantage in that the conversion runs may be made much longer between regenerations of the catalyst to remove coke deposits. Thus an unconditioned catalyst can be run for 3 or 4 hours before coke contamination becomes so serious that the catalyst must be regenerated by burning. When catalysts are properly conditioned, conversion runs of several weeks or months are possible without regeneration of the catalyst.

The pretreatment of the catalyst is conducted at a temperature within the range effective for catalytic hydration of olefins. Preferably the pressure of conditioning treatment is also within the catalytic hydration range, thereby obviating necessity for a separate pressuring step before placing the catalyst on stream for catalytic hydration. The water used for conditioning treatment of the catalyst may be in either liquid or gaseous phase; in general, phase of the conditioning water is determined by the phase desired in the subsequent hydration treatment as will appear from the following discussion of a preferred embodiment of this invention. Where water vapor is employed, pressures upwards of 500 pounds per square inch are preferred.

In addition to the advantages arising from conditioning the catalyst by treatment with water, further improvements in operation follow upon maintaining water in the liquid phase within the bed of catalyst during the catalytic hydration treatment. This expedient, which is referred to herein as the "flooded reactor technique" seems to derive its advantage from the fact that the presence of liquid water in the reactor permits operation of the process at very high mol ratios of water to olefin without necessity for handling comparable quantities of water in the subsequent recovery equipment. When the process is operated wholly in the vapor phase, it is found that the mol ratio of water to olefin in the charge is an important factor with respect to yield of the desired product. A true vapor phase reaction operates best at a mol ratio of 10:1 and thus requires that the recovery equipment be adapted to handle tremendous quantities of water as compared with the quantities of alcohol and unconverted olefin leaving the reaction zone.

By way of contrast, the flooded reactor technique makes it possible to charge a mixture having a water to olefin mol ratio of about 2 and passing an equivalent quantity of water with the reaction effluent to the recovery equipment. The mol ratio in the reaction zone is, however, tremendously higher and may be on the order of 50 or 100:1.

Catalytic hydration of olefins according to this invention may be conducted over a wide range of conditions. In general, elevated temperatures are necessary, in excess of 250° F. for flooded reactor operation and above about 300° F. for vapor phase reactions. It is desirable to operate below temperatures at which extensive cracking occurs and for this reason the maximum desirable temperature is about 700° F. Best operations are obtained at 350–500° F. for flooded reactor, preferably 400–450° F., and 550–650° F., preferably 600° F. for vapor phase reactions. Elevated pressures are necessary for good operation and it will be apparent that the pressure must be adjusted relative to the temperature to maintain the phase relationships desired. Pressures of 375–3000 p. s. i. g. are suitable but better conditions are found between 750 and 2000 p. s. i. g. It is preferred to operate at about 1000 pounds under flooded reactor conditions and at about 1500 pounds for vapor phase reactions. Pressures above 3000 p. s. i. g. increase conversion but also increase processing difficulties.

The two types of operation, namely vapor phase and flooded reactor, differ greatly with respect to desirable mol ratios of water to hydrocarbon and space velocity. As used herein space velocity refers to volumes of liquid feed per hour per volume of catalyst space. Desirable mol ratios are controlled by two opposing considerations. The higher the mol ratio, the greater the selectivity of the process but increased mol ratios also increase the costs of handling large quantities of excess water in charge preparation and product recovery. Vapor phase reactions operate satisfactorily at mol ratios between 5 and 20:1, preferably between 7 and 15:1 with optimum results in the neighborhood of 10:1. Under flooded reactor conditions external mol ratios between 0.5 and 5:1 are suitable with preference for ratios between 1 and 3:1. The optimum is about 2:1.

The vapor phase reactions may be conducted at space velocities preferably between 1 and 5 with an optimum at about 3. Space velocities for flooded reactor operation may vary between 0.2 and 5.0, preferably 0.5 to 2.0, the minimum of the preferred range being about optimum.

In the following examples, it is demonstrated that, in general, coprecipitated and like homogeneous silica-alumina catalysts for hydration should contain from 1 to 35 per cent of alumina. This is the principle underlying copending application Serial No. 153,306, filed March 31, 1950, and now abandoned. However, when the catalyst is formed by precipitating silica on alumina, these limits no longer apply. It is quite apparent that the active surface so formed will be predominantly silica. The present results are therefore not inconsistent with the general principle.

*Example I*

A silica-alumina bead catalyst (see Marisic Patent 2,384,946) containing 90% silica and 10% alumina by weight and substantially free of sodium oxide was treated with water at 590° F. and a pressure of 1500 p. s. i. g. A total volume of 500 ml. of catalyst was thus contacted with 975 ml. of water at a space velocity of about 2 in the absence of olefin. Thereafter a mixture containing 924 grams (22 mols) of propylene and 3991 grams (222 mols) of water was brought to 590° F. and passed through the catalyst at a pressure of 1500 p. s. i. g. and a space velocity of 3. After 4 hours of operation, 111 grams of pure isopropyl alcohol was produced. This represents a yield of 12 weight per cent of the alcohol based on propylene charged. Further data on the run are shown in the table below.

*Example II*

The catalyst of this example was a silica-alumina composite containing 87.5% $SiO_2$ and 12.5% $Al_2O_3$. The catalyst was prepared by co-precipitation, washed, base exchanged for removal of sodium and water washed until the effluent was free of salts removed from the gel. Thereafter the gel was kneaded to form a heavy slurry, cast in perforated steel plates, and dried. A total volume of 500 ml. of catalyst was pretreated with 500 ml. of water at 587° F., 1500 p. s. i. g. and a space velocity of 1. The charge was made up by mixing 247 grams (5.9 mols) of propylene and 1000 grams of water (55.5 mols) and charged to the catalyst under the same conditions as those stated for the water pretreatment, except that the space velocity was increased to 3. During one hour of operation, 37 grams of pure isopropyl alcohol was produced, equivalent to 15 weight per cent of isopropyl alcohol based on propylene charge. See the table for further data on this run.

Example III

The two preceding examples illustrate vapor phase reaction and the present example is concerned with an operation under flooded reactor conditions. A total of 500 ml. of catalyst as described in Example I was treated with 500 grams of water maintained in liquid phase at 412° F., 750 p. s. i. g. and a space velocity of 1.0. The charge mixture was made up of 346 grams (8.3 mols) of propylene and 300 grams (16.7 mols) of water which was pumped over a period of 4 hours through the reactor under the same temperature and pressure conditions as those prevailing for the pretreatment and space velocity of about 0.5. As a result of the pretreatment, the reactor was filled with liquid water prior to the introduction of the charge which bubbled up through the water in the reaction space. The product contained 38 grams of pure isopropyl alcohol representing a yield of 11% by weight based on propylene charged.

Example IV

Straight silica gel was used as the catalyst under flooded reactor conditions with a yield of 1.5% isopropanol. A total volume of 500 ml. of catalyst was treated with 500 grams of water at 430° F. and 750 p. s. i. g. Thereafter, a mixture of 512 grams of propylene (12.2 mols) and 455 grams of water (25.3 mols) was passed through the catalyst at a space velocity of 1.0, a temperature of 430° F. and a pressure of 750 p. s. i. g. over a period of 3 hours.

Example V

Activated alumina was conditioned by treatment with steam under conditions similar to those of the reaction. Subsequent reaction of a 10:1 mixture of water and propylene at a space velocity of 3 for 3 hours at 595° F. and 1500 p. s. i. g. on the conditioned catalyst gave a yield of 4.9% isopropanol. Further details in the table.

Example VI

The results using alumina gel were relatively poor as shown in the table.

Example VII

A co-precipitate of silica and alumina containing 75% silica and 25% alumina conditioned by steam gave a yield of 10.5% isopropanol at 99% selectivity.

Example VIII

A co-precipitated gel containing 57% $SiO_2$ and 43% $Al_2O_3$ was treated with 500 cc. of water at 595° F. and 1500 p. s. i. over a period of one hour. The hydrocarbon was then added without stopping the water addition. 2411 grams (134 mols) of water and 561 grams (13.4 mols) of propylene were pumped over a period of two and one half hours at a space velocity of 3.0, 595° F., and 1500 p. s. i. No alcohol was found in the effluent.

Example IX

A silica-alumina gel containing 65% $SiO_2$ and 35% $Al_2O_3$ by weight was treated with 500 cc. of water at 430° F. and 1500 p. s. i. over a period of one hour. With the catalyst still in contact with liquid water a mixture of 171 grams (4.08 mols) of propylene and 175 grams (9.73 mols) of water was pumped over the catalyst at a space velocity of 1.0, 430° F., and 1500 p. s. i. The yield of isopropanol was 9.0 per cent by weight and a selectivity of 99 per cent.

Example X

A catalyst prepared by impregnating $Al_2O_3$ with $SiO_2$ to prepare a finished catalyst of 25 weight per cent $SiO_2$ was pretreated with liquid water under reaction conditions. While keeping the catalyst wet with liquid water, a reaction mixture of 2 mols of water per mol of propylene was pumped through the catalyst at 1500 p. s. i., 425° F., and a space velocity of 1 for one hour. The effluent showed a yield of 10.4 weight per cent isopropanol and no polymer. This example demonstrates that the catalytic effect is found at the surface of the catalyst. Upon impregnation of alumina with silica, a surface is formed in which silica predominates, although a complete analysis would show alumina as the predominant component. Apparently the alumina molecules below the surface are ineffective, since it has been demonstrated that a homogeneous catalyst of the present composition is practically useless.

Example XI

The catalyst employed was prepared by treating activated alumina with water glass (0.204 gram $SiO_2$/cc.) in a quantity to give a finished product containing 10% $SiO_2$ for ½ hour. The catalyst was treated with 4 N hydrochloric acid for one hour, washed free of chlorides, oven dried and muffled. The catalyst was treated with water under reaction conditions. The hydration reaction was conducted at 1500 pounds and 430° F. with a space velocity of 1.0 during a period of one hour. At a molar ratio of two parts of water per part of propylene, the isopropanol yield was 7.7 per cent of theoretical at a selectivity of 99%.

Example XII

The catalyst was prepared in the same manner as in the previous example, except that two impregnations were made to give a final composite containing 25% $SiO_2$. Pretreatment and hydration were conducted as in Example XI, giving a yield of 10.4% of isopropanol at a selectivity of 99%.

Example XIII

In this example the activated alumina was treated with sufficient ethyl silicate to give 2% $SiO_2$ in the finished catalyst. The impregnating solution in alcohol contained 0.270 gram $SiO_2$/cc. The impregnated alumina was oven dried and muffled at 1000° F. The catalyst was then treated with liquid water at reaction conditions and utilized in the hydration of propylene. During a 1.5 hour run a mixture of 4.5 mols of water per mol of propylene was passed through the catalyst at a space velocity of 1.0, pressure of 1500 pounds and temperature of 408° F. The yield of isopropanol was 1.07% at 99% selectivity.

Example XIV

This run differed from Example XIII in that the alumina was impregnated with ethyl silicate to give a final catalyst containing 10% $SiO_2$, the water to propylene mol ratio was 4.9 and the reaction temperature was 435° F. The yield of isopropanol was 11.0% and the selectivity 99%.

TABLE

| Example | Catalyst | | | | | Reaction conditions | | | | | | Yield (weight percent) | | | | | |
|---|---|---|---|---|---|---|---|---|---|---|---|---|---|---|---|---|---|
| | Catalyst type | SiO$_2$ | Al$_2$O$_3$ | Na$_2$O | Conditioning | Phase | H$_2$O/C$_3$H$_6$ | Temp., °F. | Pressure | Space velocity | Duration, hr. | Iso-propanol | Polymer | Propane | Acetone | Coke | Selectivity |
| I | Gel | 90 | 10 | 0.1 | Steam | Vapor | 11 | 590 | 1,500 | 3 | 4 | 12 | 0.0 | 0.0 | 0.04 | 0.04 | 99 |
| II | Coprecipitate and gel | 87.5 | 12.5 | | do | do | 9 | 587 | 1,500 | 3 | 1 | 15 | 0.0 | 0.0 | 0.10 | 0.03 | 99 |
| III | Gel | 90 | 10 | 0.0 | Water | Mixed | 2 | 412 | 750 | 0.5 | 4 | 11 | 0.0 | 0.0 | 0.0 | 0.1 | 98 |
| IV | Silica gel | 100 | 0 | | Steam | Vapor | 10 | 589 | 1,500 | 3 | 1¾ | 1.5 | | | | | |
| V | Activated alumina | 0 | 100 | | do | do | 10 | 590 | 1,500 | 3 | 2 | 4.9 | 0.0 | 0.0 | 0.0 | 0.1 | 94 |
| VI | Gel alumina | 0 | 100 | | do | do | 10 | 597 | 1,500 | 3 | 1 | 6.6 | 6.0 | 0.0 | 0.0 | 0.7 | 57 |
| VII | Gel | 75 | 25 | | do | do | 8 | 590 | 1,500 | 3 | 1 | 10.5 | 0.0 | 0.0 | 0.04 | 0.03 | 99 |
| VIII | Coprecipitate | 57 | 43 | | do | do | 10 | 595 | 1,500 | 3.6 | 2.5 | 0.0 | | | | | |
| IX | Gel | 65 | 35 | | Water | Mixed | 2.4 | 430 | 1,500 | 1.0 | 1.0 | 9.6 | | | | 0.0 | 99 |
| X | Impregnated SiO$_2$ on Al$_2$O$_3$ | 25 | 75 | | do | do | 2.3 | 425 | 1,500 | 1.0 | 1.0 | 10.4 | | | | 0.0 | 99 |
| XI | do | 10 | 90 | | do | do | 2 | 430 | 1,500 | 1.0 | 1.0 | 7.7 | 0.0 | | | 0.0 | 99 |
| XII | do | 25 | 75 | | do | do | 2 | 425 | 1,500 | 1.0 | 1.0 | 10.4 | 0.0 | | | 0.0 | 99 |
| XIII | do | 2 | 98 | | do | do | 4.5 | 408 | 1,500 | 1.5 | 1.07 | 11.0 | 0.0 | | | 0.0 | 99 |
| XIV | do | 10 | 90 | | do | do | 4.9 | 435 | 1,500 | 1.0 | 1.5 | 11.0 | 0.0 | | | 0.0 | 99 |

We claim:

In a process for converting olefins of three to five carbon atoms into the corresponding alcohols by contacting such olefins in the presence of a molar excess of water with a catalyst at a pressure of about 375 to about 6000 pounds per square inch and a temperature of about 250° F. to about 700° F., the improvement which comprises conducting said contacting with a catalyst consisting substantially of porous alumina on the surfaces of which silica has been uniformly precipitated to provide surfaces predominating in silica, said catalyst containing about 10 to about 25 weight per cent silica and the remainder consisting essentially of alumina.

SIGMUND J. LUKASIEWICZ.
WILLIAM I. DENTON.
CHARLES J. PLANK.

References Cited in the file of this patent

UNITED STATES PATENTS

| Number | Name | Date |
|---|---|---|
| 1,736,785 | McKee et al. | Dec. 10, 1929 |
| 1,907,317 | Brown et al. | May 2, 1933 |
| 2,126,952 | Dreyfus | Aug. 16, 1938 |
| 2,292,561 | Eversole et al. | Aug. 11, 1942 |
| 2,519,061 | Mason | Aug. 15, 1950 |
| 2,575,556 | Maycock et al. | Nov. 20, 1951 |

OTHER REFERENCES

Sachanen, "Conversion of Petroleum," second edition, pages 314 and 315, pub. by Reinhold Publishing Corp., New York (1948). (Report taken from article by A. V. Frost, J. Phys. Chem. (Russ.), vol. 14, page 1303 (1940).)